United States Patent
Wehner

[15] 3,659,477
[45] May 2, 1972

[54] REMOTE CONTROL MIRROR AND CONTROL MECHANISM THEREFORE

[72] Inventor: William C. Wehner, 14891 Grandville, Detroit, Mich. 48223

[22] Filed: Apr. 16, 1970

[21] Appl. No.: 29,195

[52] U.S. Cl. ..........................................................74/501 M
[51] Int. Cl. ...................................................F16c 1/12
[58] Field of Search ............74/501 M, 501, 502, 504, 89.15, 74/491

[56] References Cited

UNITED STATES PATENTS

| | | | |
|---|---|---|---|
| 2,933,019 | 4/1960 | Milton | 74/501 |
| 3,476,464 | 11/1969 | Clark | 74/501 M |
| 2,962,933 | 12/1960 | Hezler | 74/501 M |
| 3,352,524 | 11/1967 | Rossi | 74/501 M |
| 3,411,372 | 11/1968 | Skillin | 74/501 M |

*Primary Examiner*—Milton Kaufman
*Attorney*—Raymond E. Scott

[57] ABSTRACT

A remotely controlled mirror, such as a vehicle rear view mirror, including a pivotally supported mirror member, a rotatable linkage system and a drive mechanism. The linkage system includes at least two pivotally connected link members; the first link member operably connected to the mirror member at a fixed acute angle relative to the reflective surface, and the second link member drivably connected to the first link member at a variable angle. The drive mechanism is adapted to rotate the linkage system, adjusting the position of the mirror relative to the vertical and horizontal axes, and shift the distal end of the second link member toward the mirror, adjusting the angle of inclination of the mirror relative to the axis perpendicular to the mirror.

12 Claims, 13 Drawing Figures

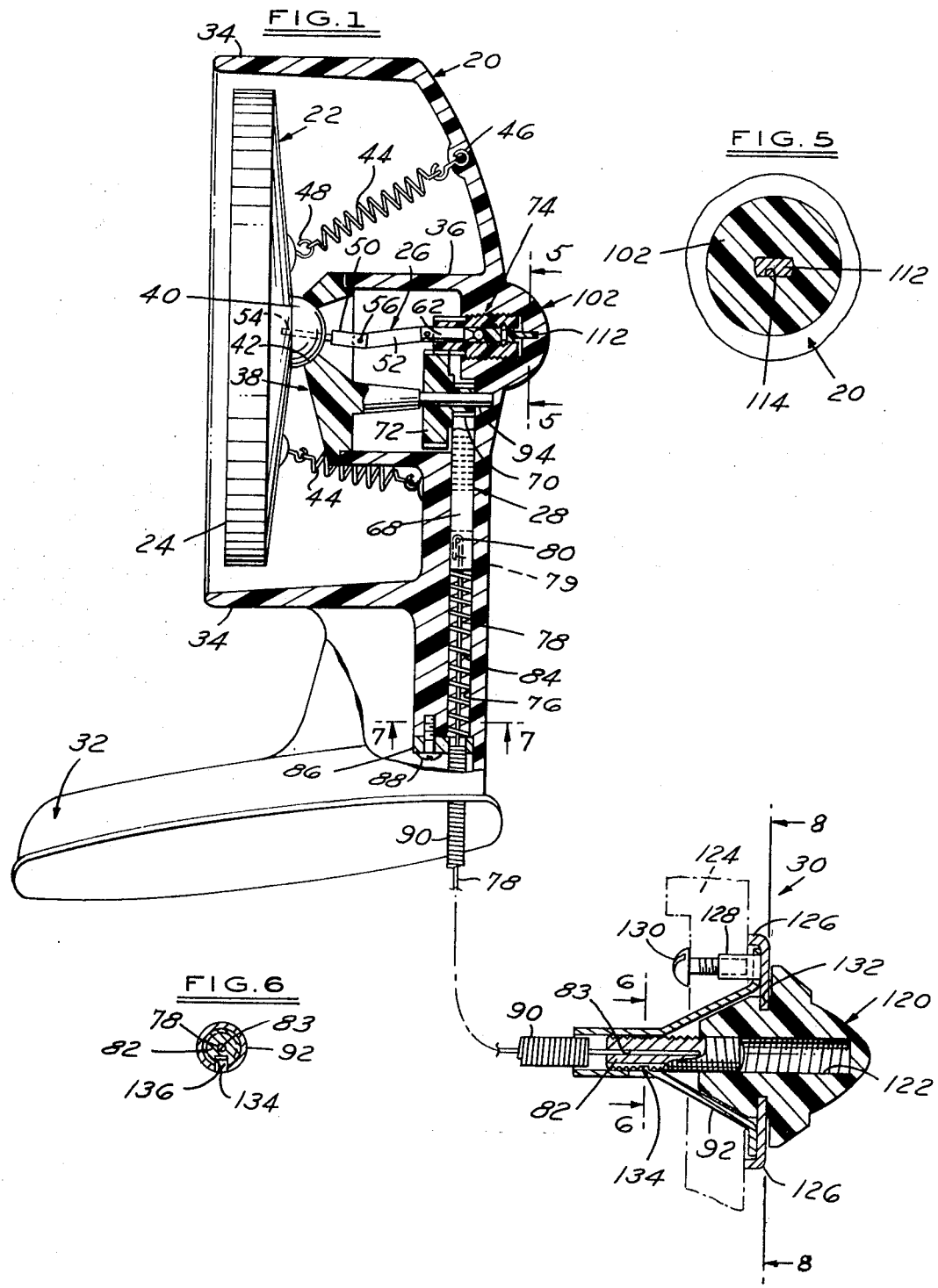

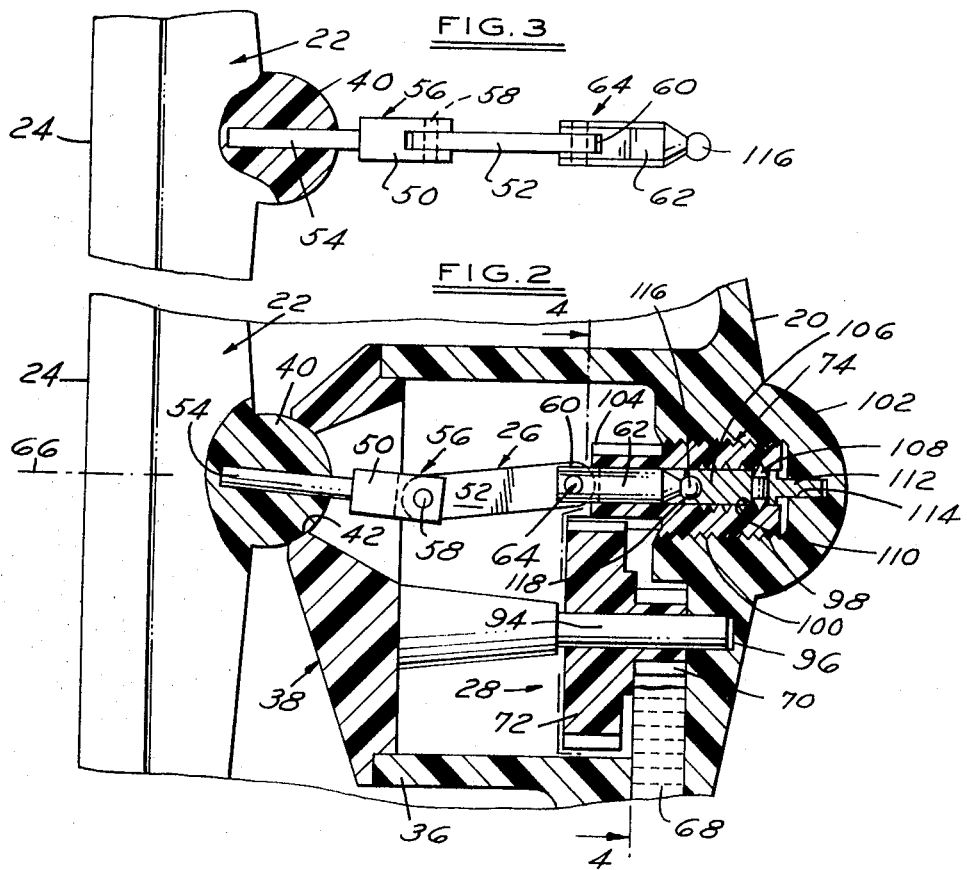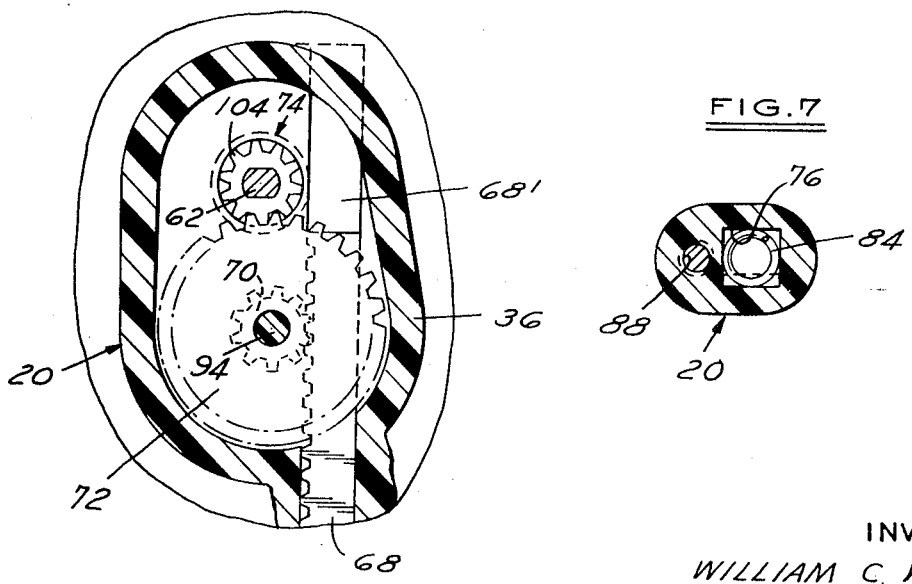

INVENTOR
WILLIAM C. WEHNER
BY
ATTORNEY

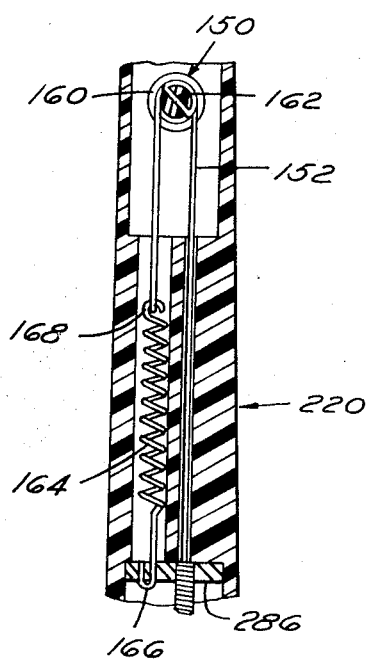
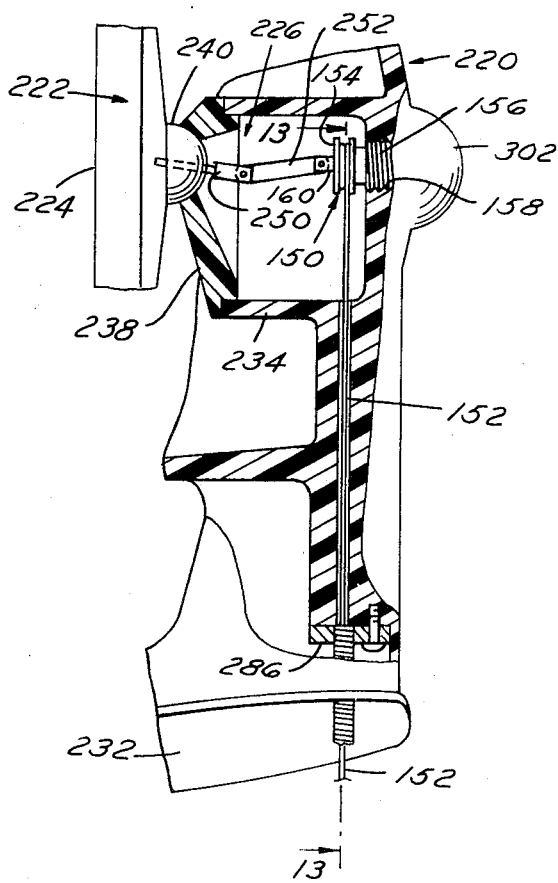

REMOTE CONTROL MIRROR AND CONTROL MECHANISM THEREFORE

DESCRIPTION OF THE PRIOR ART

The remote control mechanisms disclosed by the prior art for rear view mirrors and the like may be divided into two categories; the push-turn type, which requires only one control wire, and the multiple wire controls. The push-turn control mechanisms include a single control wire which is connected to the drive mechanism, normally in the rear view mirror housing or adjacent thereto. The wire is turned by a knob or button within the vehicle to adjust the mirror in one axis and pushed or pulled to adjust the mirror in the other axis. The turning of the wire within its sheath is however subject to failure, especially in cramped conditions, and is not considered satisfactory. Examples of push-turn devices shown by the prior art include the following U.S. Pat. Nos.:

| | |
|---|---|
| 3,411,372 | 3,253,509 |
| 3,403,579 | 3,251,233 |
| 3,390,588 | 2,614,437 |
| 3,325,239 | 2,573,127. |

The multiple wire control mechanisms for rear view mirrors shown by the prior art merely utilize two or more wires to individually adjust the mirror in the vertical and horizontal axes, duplicating the individual controls. An example of such a device is shown in U.S. Pat. No. 2,903,944.

SUMMARY OF THE INVENTION

The control mechanism for the remote control mirror of this invention is adapted to utilize a single control wire for adjusting the mirror in the vertical and horizontal axes merely by turning the control knob, eliminating the relatively complex push-turn adjustment. Further, the wire is not turned or rotated in the sheath during adjustment of the mirror, but is shifted axially, thereby eliminating the problem of binding in the sheath. In the preferred embodiment of this invention, the mirror is adjusted in a predetermined spiral path, with each revolution of the control knob, adjusting the mirror in a greater arc or angle of inclination relative to an axis perpendicular to the reflective surface.

The control mechanism of this invention includes a pivotally supported mirror member having a generally planar reflective surface, a rotatable linkage system and a drive mechanism. The linkage system is adapted to adjustably tilt the mirror member as it is rotated and includes at least two pivotally connected, angularly connected link members. The first link member is operably connected to the mirror member at a fixed acute angle to the reflective surface, such that the mirror member is tilted in response to rotation of the first link member about an axis perpendicular to the reflective surface, defining a right angled cone in revolution. The second link member is pivotally and drivably connected to the first link member at one end and to the drive mechanism at the opposite end. The drive mechanism is adapted to rotate the linkage system, thereby tilting the mirror relative to the horizontal and vertical axes.

In the preferred embodiment of the control mechanism of this invention, the drive mechanism is adapted to shift the end of the second link member toward the mirror as the linkage system is rotated, thereby reducing the angle defined between the link members and increasing the angle of inclination of the mirror. The mirror member will thereby define a spiral path as it is adjusted, with the angle of inclination relative to an axis perpendicular to the reflective surface changing with each revolution of the link system. It will be understood that the mirror member would define a right angled cone if the link were not shifted as described.

In the disclosed embodiment, the second link member is shifted by a differential screw mechanism which increases the rate of movement as the end of the link member is shifted toward the mirror, providing a relatively fine adjustment for the mirror at relatively small angles of inclination and a relatively coarse adjustment at the larger angles. In one of the disclosed embodiments, the drive mechanism includes a gear rack which engages a pinion rotatably driving the linkage system. In the other embodiment, the control wire is received on a rotatably mounted spool which drives the linkage system. Other advantages and meritorious features will more fully appear from the following brief description of the drawings, description of the preferred embodiment and claims.

BRIEF DESCRIPTION OF THE DRAWINGS

FIG. 1 is a side elevation, partially cross sectioned, of the remote control mirror of this invention;

FIG. 2 is an enlarged partially cross sectioned side view of the control mechanism of the remote control mirror shown in FIG. 1;

FIG. 3 is a top elevation of a portion of the control mechanism shown in FIG. 2;

FIG. 4 is a cross sectional view of the control mechanism shown in FIG. 2, in the direction of view arrows 4—4;

FIG. 5 is a cross sectional view of the remote control mirror shown in FIG. 1, in the direction of view arrows 5—5;

FIG. 6 is a cross sectional view of the remote control mirror shown in FIG. 1, in the direction of view arrows 6—6;

FIG. 7 is a cross sectional view of the remote control mirror shown in FIG. 1 in the direction of view arrows 7—7;

FIG. 12 is a partially cross sectioned side elevation of another embodiment of the remote control mirror of this invention; and FIG. 13 is a cross sectional view of the embodiment shown in FIG. 12 in the direction of view arrows 13—13.

DESCRIPTION OF THE PREFERRED EMBODIMENTS

Figure 8:
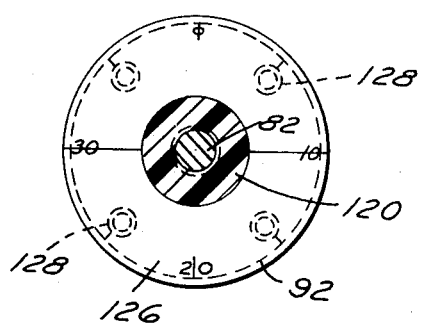
FIG. 8 is a partially cross sectioned end view of the adjustment control shown in FIG. 1 in the direction of view arrows 8—8.

The embodiment of the remote control mirror shown in FIGS. 1 to 9 includes an integral housing 20, a mirror member 22 having a generally planar reflective surface 24, a linkage means or system indicated generally at 26, a drive mechanism indicated at 28 and a remote control means shown at 30. The housing may be integrally formed from various materials including plastic, and includes a base portion 32 adapted to secure the remote control mirror to a vehicle panel or the like, an enclosure portion 34 adapted to receive the mirror member 22 and a mirror support portion 36. A bearing support member 38 is secured within the housing to the support portion 36, such as by plastic bonding or the like. The bearing support member is preferably formed of a friction resistant plastic material, such as nylon or Delrin, because it is adapted to bearingly support the mirror member.

The mirror member 22 includes a semispherical bearing portion 40 which is bearingly received in a spherically shaped socket 42 provided in the bearing support 38, as shown in FIG. 1. The mirror member in this embodiment is retained in the spherical socket 42 by three springs 44 which also limit rotation of the mirror member. Hooks 46 and 48 may be cast or molded in the enclosure portion 34 and mirror member 22, respectively, to retain the springs 44 as shown.

The linkage system 26 includes at least two pivotally secured, angularly related link members 50 and 52, as best shown in FIGS. 2 and 3. The first link member 50, in this embodiment of the invention, includes a pin-shaped end portion 54 which is rotatably received in the semispherical bearing portion 40 of the mirror member, and defines a fixed acute angle to the reflective surface 24 of the mirror member. The second link member 52 is drivably and pivotally connected to the first link member by a clevis 56, as best shown in FIG. 3. The end of the first link member is bifurcated to receive the end of the second link member, which is pivotally secured by a roll pin 58. The opposite or distal end 60 of the second link member is pivotally and drivably connected to a drive pin 62 of the drive mechanism by a second clevis 64.

The drive mechanism 28 in this embodiment is adapted to rotate the linkage means 26 in response to manual rotation of the control means 30. It can be seen from FIG. 2 that rotation of the linkage means 26, without changing the angular relation between the first and second link members, 50 and 52 respectively, would cause the mirror member 22 to tilt in the spherical socket 42, because of the angular relation between pin 54 and the reflective surface 24 of the mirror. The relatively planar reflective surface would in fact define a right angled cone about an axis 66, perpendicular to the reflective surface, with each revolution of the linkage system. The drive mechanism 28 of this embodiment is however adapted to shift the distal end 60 of the second link member as the linkage system is rotated, causing the reflective surface 22 of the mirror to define a predetermined arc as described hereinbelow.

The drive mechanism 28 in this embodiment includes a rectangular gear rack 68, a pinion gear 70, which is integral with the drive gear 72 as shown in FIG. 2, and a differential screw mechanism 74. The gear rack 68 is telescopically received in a rectangular channel 76 in the housing, as best shown in FIGS. 1 and 7, which prevents skewing of the gear rack. The single control wire or cable 78 is hooked at one end 79 and secured to the gear rack by a pin 80 or the like, and the opposite end of the wire is secured to a transfer screw 82 of the remote control 30. The gear rack 68 is continuously urged toward the linkage system 26 by a spiral spring 84 which is compressed in the channel 76 between the end of the gear rack and the closure mounting plate 86. The mounting plate may be secured to the housing by any conventional means, such as the screw 88, and in this embodiment the plate is adapted to secure the sheath 90 of the control wire by soldering, threading or the like. The opposite end of the sheath may be similarly secured to the mounting bracket 92 of the remote control. The pinion and drive gears 70 and 72 are rotatably mounted on a cylindrical bearing 94 which is integral with the bearing support member 38, as shown in FIG. 2. The end of the bearing is received in a cylindrical aperture 96, provided in the housing wall to retain the gear.

The differential screw mechanism shown in FIG. 2 includes an outer differential screw member 98 which is externally threaded at 100 and threadably received in an internally threaded aperture provided in a boss or enlargement 102 in the rearward wall of the housing. The exposed end of the outer screw member 98 is provided with gear teeth 104 which mate with the teeth of the drive gear 72 as best shown in FIG. 4. The inner differential screw member 106 includes a gear pin or plurality of pins 108 which are threadably received in a differential internal thread 110 of the outer member. The end of the inner member is provided with a generally rectangular slide 112 which is received in a configured slot 114 in the housing boss 102, as shown in FIG. 5, to prevent rotation of the inner differential screw member as described hereinbelow, and permit sliding axial movement. The drive pin or link 62 is provided with a universal ball head 116 which is received in a spherical socket 118 in the end of the inner differential screw member 106 as shown in FIG. 2. The drive pin or link 116 is also generally rectangular in cross section to permit axial movement and cause the drive link to rotate in unison with the outer screw member 98, as shown in FIG. 4.

Figure 9:
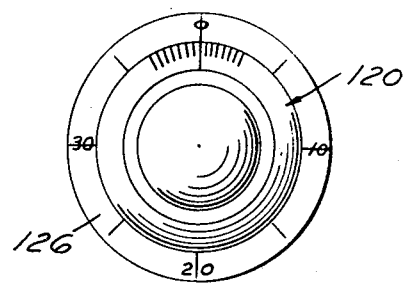
FIG. 9 is an end view of the control knob shown in FIG. 1.

The control means 30, shown in FIGS. 1, 8 and 9 includes a manual control knob or button 120 which is internally threaded at 122 to threadably receive the transfer screw 82. The transfer screw includes an axial aperture 83 which receives and secures the control cable 78 by soldering or the like. The control knob is rotatably mounted in this embodiment on a panel or the like 124, such as a vehicle door panel by a split mounting dial plate 126 which is received in a radial slot 132 of the knob, as shown in FIG. 1. The mounting dial plate is provided in this embodiment with four internally threaded rivets or caps 128 which are made integral with the dial plate by riveting, soldering or the like. The rivets are received through apertures in the mounting bracket 92 and the panel 124, and the rivets threadably receive screws 130 which secure the assembly to the panel; see also FIG. 8. The transfer screw 82 is prevented from rotating relative to the panel 124 by a tab 134 struck inwardly from the wall of the mounting bracket 92 and received in an axially extending radial slot 136 in the transfer screw, as shown in FIGS. 1 and 6.

Manual rotation of the control knob 120 will thereby cause axial movement of the transfer screw 82 and the control wire or cable 78 which is secured therein as shown in FIG. 1. When the cable is not under tension, the spring 84 will normally urge the gear rack 68 upwardly, away from the base 32 of the housing as described above. Tensioning of the cable, by rotation of the control knob 120, will cause the gear rack to traverse downwardly, rotating the integral pinion and drive gears 70 and 72 respectively as shown in FIG. 4. The full travel of the gear rack is indicated in phantom in FIG. 4 by reference characters 68 and $68^1$. Rotation of the drive gear 72 causes rotation of the outer differential screw member 98 and drive link or pin 62 because of the gear engagement between the gear portion 104 of the outer screw member and the drive gear, as shown in FIG. 4. The linkage means 26 will also rotate in unison with the drive link 62, causing the mirror member 22 to tilt as described hereinabove. In this embodiment, the gear ratio between the drive gear 72 and the gear portion 104 of the outer differential screw member is 4 to 1 to accommodate four revolutions of the linkage means, as described hereinbelow, however this ratio is considered a matter of design.

In this embodiment of the remote control mirror, the rotation of the outer differential screw member 98 also causes the inner screw member 106 to shift axially because of the threaded engagement between the differential screw members and the fact that the inner member is prevented from rotating by the slide portion 112. As the inner differential screw member is shifted toward the mirror member, the angle defined between the link members 50 and 52 shown in FIGS. 1 and 2 decreases, increasing the "angle of inclination" of the reflective surface 24 of the mirror. Conversely, the angle of inclination will decrease as the end 60 of the second link member is shifted away from the mirror. The axis 66 perpendicular to the reflective surface of the mirror will thereby define a predetermined arc in revolution as described hereinbelow.

The "angle of inclination" of the reflective surface of the mirror, as defined herein, refers to the angle defined between the axis 66 of the mirror perpendicular to the reflective surface at the time of measurement and an axis perpendicular to the reflective surface when the reflective surface of the mirror is in the vertical position. The angle of inclination thus increases as the mirror is tilted relative to the vertical or horizontal axes.

Figure 10:
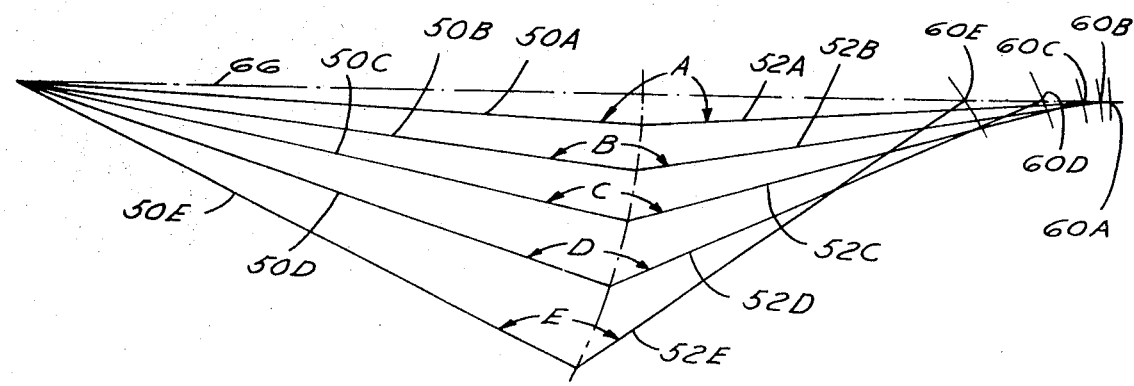
FIGS. 10 and 11 graphically illustrate the movement of the mirror of the remote control mirror of this invention.
Figure 11:
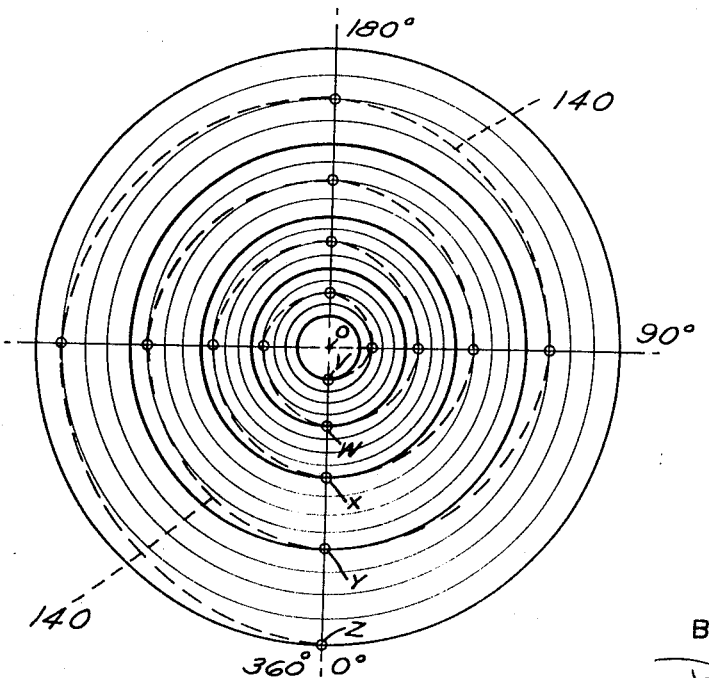

FIGS. 10 and 11 illustrate schematically the motion of the link members 50 and 52 and thereby the angle of inclination of the reflective surface of the mirror member. In FIG. 10, the positions of the link members are plotted for each revolution of the linkage means 26 and FIG. 11 illustrates graphically the motion of the first link member 50 and the angle of inclination of the reflective surface of the mirror. The angle "A" defined between the link members 50 and 52, when the drive link or pin 62 is in the rearward position, is illustrated in FIG. 10 at 50A and 52A respectively. The position of the link members after one complete revolution of the linkage means is illustrated at 50B and 52B, wherein the angle defined between the link members is "B;" after two revolutions at 50C and 52C, etcetera. It will be noted that the angles "A," "B," "C" etc. decrease with each revolution of the linkage means and that the angle defined between the link member 50 and the vertical axis 66 increases with each revolution, which is the "angle of inclination." The amount of decrease or change in the angle between the link members will depend upon the distance the distal end 60 of the second link member is shifted. The position of the end 60 of the second link member after each revolution is indicated at 60A, 60B, 60C, etc.

In this embodiment of the control mechanism, the end 60 of the second link member is shifted by a differential screw mechanism 74, wherein the end 60 is shifted a greater distance per revolution of the linkage means as the end approaches the mirror member, as shown in FIG. 10, and a smaller distance per revolution in the opposite direction. A fine adjustment for the reflective surface of the mirror is thereby provided in the nearly "vertical" adjustment range, assuming the mirror is mounted vertically, and a relatively coarse adjustment is provided at greater angles of inclination.

The circular graph of FIG. 11 is a three dimensional representation of the movement of the mirror member as it is adjusted by the control means. The "Archimedian spiral" 140 is a plot of the angle defined between the first link member 50 and the vertical axis 66 and is generated by "revolving" the schematic representation of FIG. 10. The center point "O" would represent a "zero angle" between the first link member and the vertical axis, wherein the link members are coaxially aligned; this is represented by the axis 66 in FIG. 10. It can be seen from FIG. 11 that the control mechanism of this invention is not intended to permit alignment of the link members and a minimum deflection "V" is required which corresponds to angle "A" in FIG. 10. The drive link 62 at this point is fully retracted from the mirror member, as described above, and the mirror is substantially vertical as shown in FIGS. 1 and 2. Points "W," "X," "Y" and "Z" in FIG. 11 represent the angular deflection of the first link member 50 after each revolution of the linkage means, as shown in FIG. 10, and the spiral 140 traces the angular deflection during each revolution.

The angular deflection of the first link member, plotted in FIG. 11, directly corresponds to the angle of deflection of the reflective surface of the mirror, because the angle defined between the mirror and the first link member is fixed as shown in FIGS. 1 and 2. The Archimedian spiral 140 of FIG. 11 may therefore be considered a plot of the angle of deflection, defining the movement of the mirror. It will also be noted from FIG. 11 that each revolution of the linkage means, as the distal end 60 of the second link member approaches the mirror, increases the angle of inclination of the mirror at a greater rate; that is, point "Z" is further from point "Y" than point "Y" is from point "X," etc. The increase is caused by the differential screw mechanism as described above.

The mounting dial plate 126 may be marked with indicia, as shown in FIGS. 8 and 9, to permit location of a specific adjustment. It should be noted that the remote control mirror of this invention need not be adjusted four revolutions in normal applications, because the necessary angle of adjustment is relatively small, especially in automotive applications. Further, the critical adjustment will normally be in the first or second revolution, which is in the fine adjustment range of the control mechanism.

The embodiments of the remote control mirror shown in FIGS. 12 and 13 functions substantially as described hereinabove, except that the drive mechanism in this embodiment utilizes an integral reel-screw 150, rather than the rack, pinion and differential screw mechanism described, to reduce the manufacturing costs. The elements of this embodiment which may be identical to the embodiment shown in FIGS. 1 to 9 have been numbered in the same sequence as above to eliminate redundant description, starting with 220 identifying the housing. The control means 30 in FIG. 1 may also be utilized in this embodiment to axially shift the control wire 152.

The reel-screw member 150 includes a reel portion 154 which receives a plurality of coils or turns of the control wire, a threaded screw portion 156 which is threadably received in a threaded aperture 158 in the housing boss 302 and an integral drive link 160. The control wire 152 is connected at one end to the control means, not shown, and the opposite end is coiled a predetermined number of turns around the reel portion 150; then through an aperture 162 in the reel portion, to a tension spring 164, as shown in FIG. 13. The number of turns of control wire on the reel portion depends upon the number of adjustment turns desired for the linkage means 226. Where four adjustment turns are desired, as described above, the control wire is coiled four times around the reel portion. The control wire is then received through the aperture 162 to lock the wire on the reel portion, and the spring 164 tensions the end of the wire toward the mounting plate 286. One end 166 of the spring is hooked to the mounting plate 286 and the other end 168 secures the control wire 152.

Rotation of the control means, in a direction tensioning the control wire, uncoils the wire from the reel portion 154, rotating the reel screw 150. Rotation of the control means in the opposite direction releases the control wire and the tension spring 164 causes the control wire to coil on the reel portion, rotating the reel-screw in the opposite direction. The integral drive link 160 is drivably and pivotally connected to the second link member 252, as described hereinabove, and the linkage means 226 therefore rotates in unison with the reel-screw.

Rotation of the reel-screw 150 also threads the screw portion 156 into or out of the threaded aperture 158, shifting the distal end of the second link member toward or away from the mirror member and causing the mirror member to tilt in a predetermined spiral path, as described above. The screw portion 156 in this embodiment has a conventional thread, shifting the distal end of the second link member at a constant rate, rather than a "differential rate" as described above. The spiral path of the first link member 250 will therefore be "constant," changing the spiral 140 shown in FIG. 11. In this embodiment, the points "V," "W," "X," "Y" and "Z" will therefore be evenly spaced, defining a constant or regular spiral. The motion will otherwise be the same as described hereinabove.

One of the advantages of the remote control mirror of this invention is that a large number of the components may be formed from plastic materials, including the mirror member, housing and bearing support, the linkage means including the drive link and the gearing system including the differential screw mechanism. It will be understood however that each of the components may also be formed from various metals.

What is claimed is:

1. A remotely controlled mirror, comprising: a pivotally supported mirror member having a generally planar reflective surface, a rotatable linkage means including at least two angularly related, pivotally connected link members, the first of said link members operably rotatably connected to said mirror member, opposite said reflective surface at a fixed acute angle to said reflective surface and the second link member drivably connected to said first link member, and a drive mechanism adapted to rotate said linkage means relatively to said mirror member, causing said mirror member to tilt relative to the vertical and horizontal axes in a predetermined path, said drive mechanism including a drive means operably connected to said second link member and adapted to shift the distal end of said second link member relative to said reflective surface, as the linkage means is rotated, varying the angle defined between said link members and the angle of inclination of said reflective surface relative to an axis perpendicular to the reflective surface.

2. The remotely controlled mirror defined in claim 1, characterized in that said linkage means is rotatable relative to said mirror member and said mirror member is secured against rotation.

3. The remotely controlled mirror defined in claim 1, characterized in that said drive mechanism includes a drive means adapted to shift the distal end of said second link, such that the rate of movement is increased as said end is shifted toward said mirror member, increasing the increment of tilt of said mirror member per revolution of said linkage means.

4. The control mechanism defined in claim 3, characterized in that said drive means includes a differential screw mechanism operably connected to said second link member, shifting the distal end of said second link member toward said mirror member as the linkage means is rotated, said differential screw mechanism causing the distal end of said second link member to shift at a differential rate as it is rotated.

5. The control mechanism defined in claim 1, characterized in that said drive mechanism includes a single wire operably connected to a control means for the mirror member and said drive mechanism, said control means adapted to shift the wire axially, causing the linkage means to rotate.

6. A remotely controlled rear view mirror, comprising: a housing having a base portion adapted to be secured to a vehicle, a mirror member pivotally secured within said housing having a relatively planar reflective surface, a rotatable linkage means including a first link member operably rotatably secured to said mirror member opposite said reflective surface at a fixed acute angle to said reflective surface and a second link member pivotally secured to said first link member at an acute angle thereto and drivable therewith, and a drive mechanism including a drive means adapted to rotate said linkage means relatively to said mirror member, causing said mirror member to tilt relative to the vertical and horizontal axes in a predetermined path.

7. The remotely controlled rear view mirror defined in claim 6, characterized in that said drive means is operably connected to said second link member and is adapted to shift the distal end of said second link member toward said mirror member, adjusting the angle defined between said link members and thereby the angle of inclination of said mirror member.

8. The remotely controlled rear view mirror defined in claim 7, characterized in that said drive means includes a differential drive means adapted to vary the rate of shifting of said second link member per revolution of said linkage means, such that the rate of shifting increases as the end of said second link member is shifted toward the mirror member and decreases as it is shifted away from said mirror member, providing a relatively fine adjustment for the mirror member at relatively small angles of inclination and relatively coarse adjustment at larger angles of inclination.

9. The remotely controlled rear view mirror defined in claim 6, characterized in that said drive mechanism includes a single control wire operably connected to said drive means and a control means, said control means adapted to shift the wire axially, causing the linkage means to rotate.

10. The remotely controlled rear view mirror defined in claim 9, characterized in that said wire is operably connected to a gear rack which forms part of the drive means, said rack shiftable axially in response to axial movement of said wire and said rack driving a gear means adapted to rotate said linkage means.

11. The remotely controlled rear view mirror defined in claim 9, characterized in that said wire is received on a rotatably supported spool means which forms part of the drive means which rotates in response to axial movement of said wire, rotating said linkage means.

12. The remotely controlled rear view mirror defined in claim 9, characterized in that said control means includes a rotatable control knob adapted to be mounted within the vehicle, said knob internally threaded to receive a transfer screw which is integral with said wire.

* * * * *